Patented Sept. 24, 1929

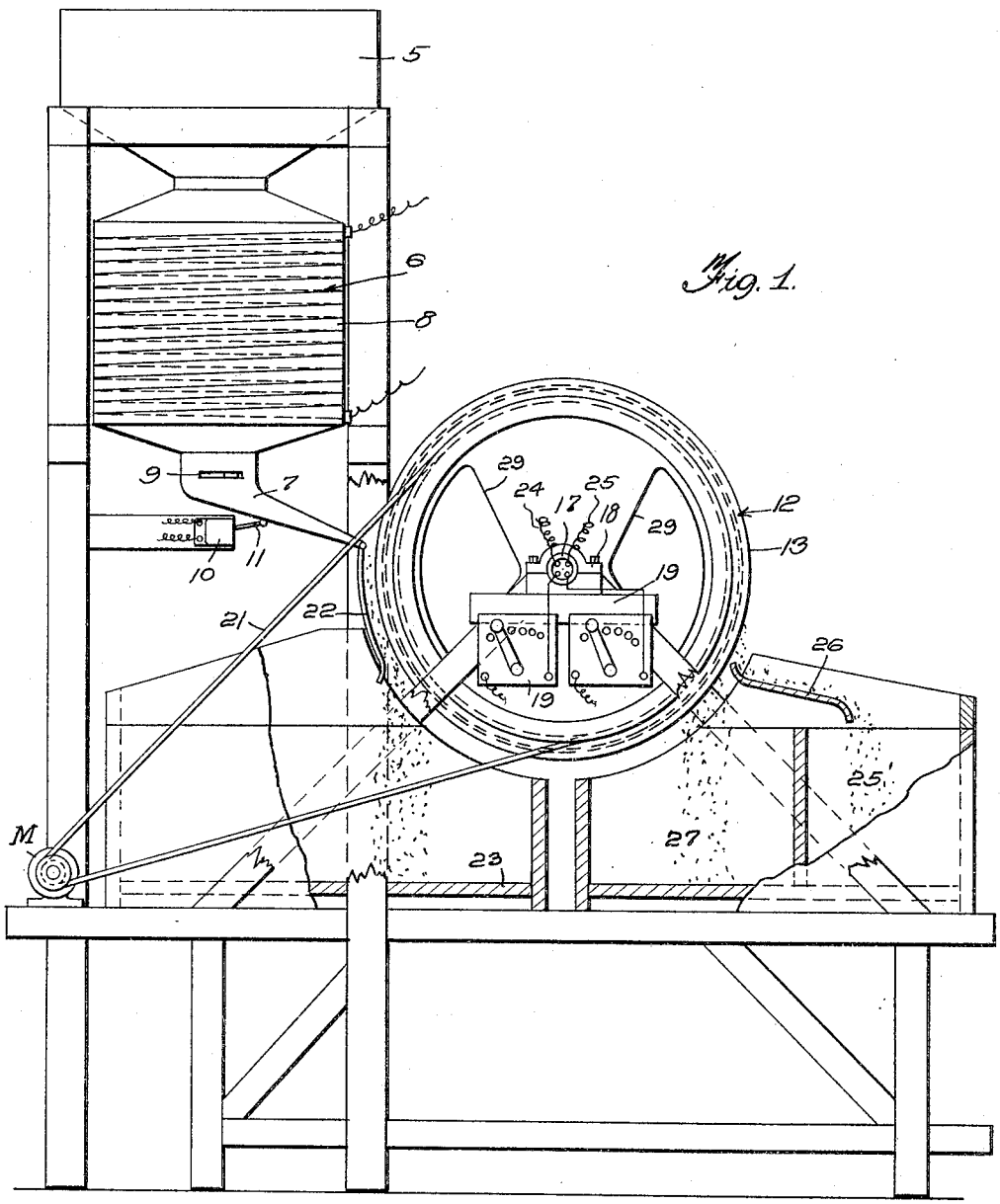

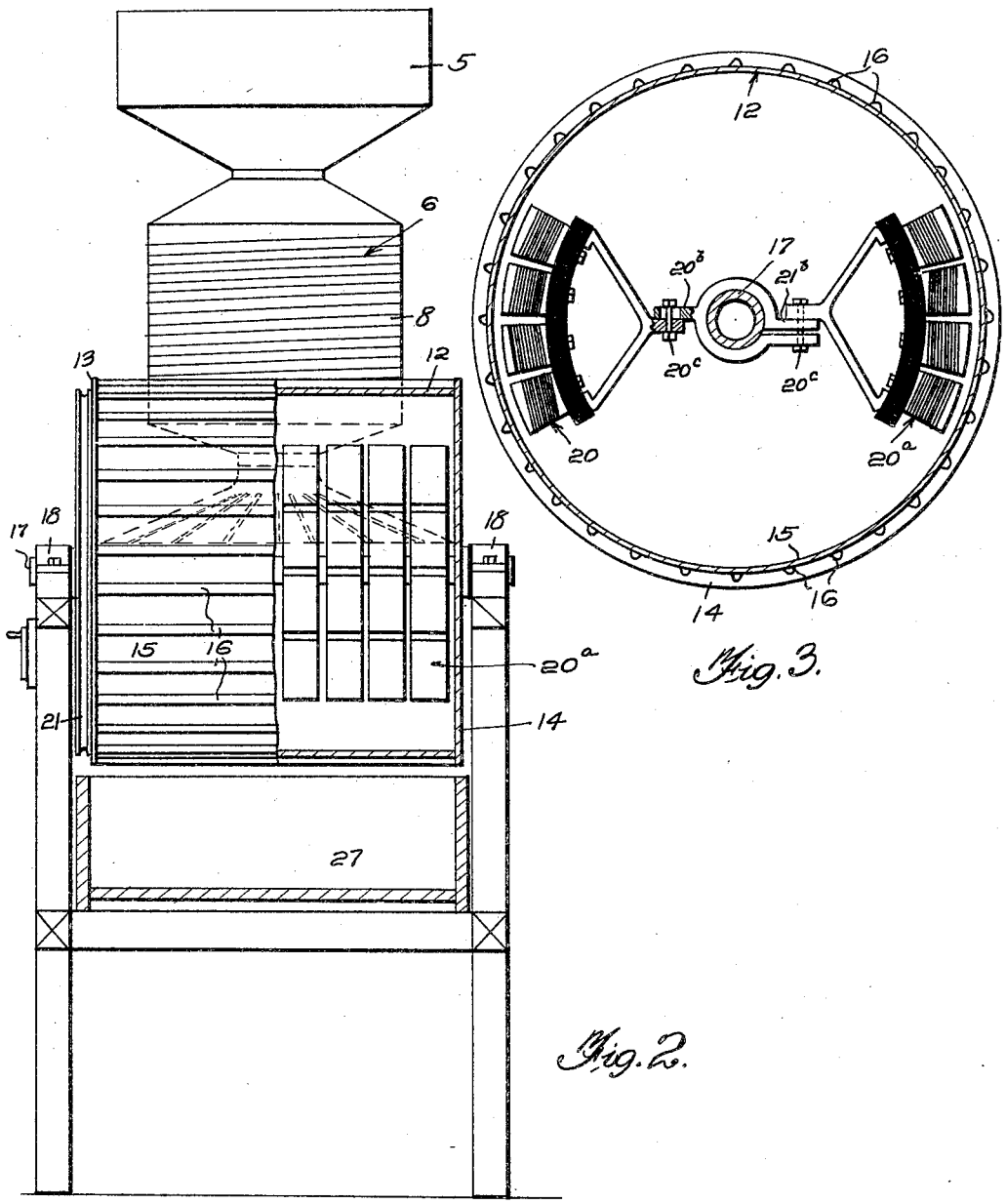

1,729,008

UNITED STATES PATENT OFFICE

HARRY P. OSBORNE, CLIFTON C. FARMER, AND REUBEN B. TEETER, OF TACOMA, WASHINGTON, ASSIGNORS OF ONE-HALF TO A. A. CRANE, OF WASHINGTON

METHOD AND MEANS FOR SEPARATING PARAMAGNETIC ORES FROM THEIR DIAMAGNETIC CONTENTS

Application filed May 21, 1928. Serial No. 279,283.

This invention relates to a method of, and means for, separating paramagnetic ores from their diamagnetic contents, or for separating paramagnetic ores of a given magnetic quality from other paramagnetic ores, having different magnetic qualities.

Certain valuable ores that are paramagnetic have, as they occur in nature, diamagnetic contents in such quantities as to render them useless for commercial purposes, in their natural state, and, therefore, of no value. For example, the high content of silica in silicate manganese ore renders this ore useless for commercial purposes.

Furthermore, even those paramagnetic ores, which have little diamagnetic content, may be greatly enhanced in value by the separation of the paramagnetic contents of different magnetic qualities, from each other. Therefore, it is the primary object of this invention to provide a method and a mechanism by which the method may be practiced for accomplishing the results outlined; namely, to separate the paramagnetic ores from their diamagnetic contents, or to separate certain paramagnetic ores of given magnetic qualities from other paramagnetic ores of different magnetic qualities, and to accomplish this in a highly economical, expeditious and efficient way.

Further objects and advantages of the invention will be set forth in the detailed description which follows.

In the accompanying drawings:

Fig. 1 is a view, partly in side elevation and partly in section, of a machine adapted to carry out the purposes of the invention.

Fig. 2 is a view partly in side elevation and partly in section through said machine, and Fig. 3 is a transverse vertical sectional view through the cylinder of the machine.

Like numerals designate corresponding parts in all of the figures of the drawings.

The machine comprises a hopper 5, in which the ground ore is placed. The ore passes from this hopper through a magnetizing or polarizing unit 6, to a delivery chute 7. The polarizer 6, in the particular form chosen for purposes of illustration, comprises a cylindrical container 8, which is constructed of a diamagnetic material, and is wound with one or more layers of copper wire. When a current of electricity is passed through this wire, a strong magnetic field or flux is produced. The proportions of the unit 6 to the feeder chute 7 are such as to maintain the ore in the polarizing unit long enough for the same to become thoroughly magnetized before passing out of the unit. A valve 9 controls the rate of flow of the ore into the chute 7. An electrical vibrator 10, which may be of the conventional electric bell type, has its hammer or vibrator 11, disposed in such position as to strike against the under side of the chute 7. The outer and lower end of the delivery chute is flared and corrugated in such manner as to distribute ore in a relatively thin stream across the length of a revolving drum 12. The drum 12 is made up of two heads 13 and 14, and a cylindrical covering 15. This cylindrical covering carries a plurality of slats 16, which are preferably triangular in cross section. All of the material of the drum and of the slats is of diamagnetic material. The drum has its bearing upon a fixed shaft 17, said shaft, in turn, being supported in blocks 18, of a supporting frame 19. The drum is caused to rotate about the fixed shaft by belt 21, and electric motor, or other source of power M. The fixed shaft 17 carries two groups of electro magnets 20 and 20$^a$. These groups of magnets extend substantially across the entire length of the drum, and the said magnets include a group of magnets, as illustrated (see Fig. 3). In other words, these magnets exert fields of different polarities at different points in the arc presented by the outer faces of the magnets 20, considered as a whole. Thus, when the magnetized ore, travelling down chute 7, comes within the range of the magnetic field, exerted by the magnets, the paramagnetic ore will be attracted and drawn to the drum, and the diamagnetic ore D, will flow past an apron 22 into a container 23. The paramagnetic ore, upon the other hand, will be carried around with the drum, and as it travels upwardly across the outer faces of the magnets 20, it will be subjected to magnetic fields of varying polarities, and this will cause the particles of ore to turn over, thereby shaking loose any diamagnetic particles which may be beneath or between them. In the continued revolution of the drum, and after the ore passes out of the magnetic field exerted by the magnets 20, it is held by the slats 16, and carried around until it comes within the range of magnetic attraction of magnets 20$^a$. Current is supplied to the magnets 20 and 20$^a$ by wires 24 and 25, which are preferably passed through the hollow shaft 17. Rheostats 18 and 19, supported upon the frame at the end of the hollow shaft, are included in the circuits to these magnets. By means of the magnetic forces which may be created in magnets 20$^a$, as controlled by rheostat 19, the stronger paramagnetic ores, such as iron and nickel, may be caused to cling to the drum through a longer period of time than the ores of lesser magnetic qualities, such as cobalt and manganese. The latter flow into a container 25, being directed into said container by a deflector 26. The ores of stronger magnetic qualities, such as iron and nickel, cling to the drum until they pass out of the field of the magnets 20$^a$, at which time they have left the deflector 26. Consequently, these latter ores flow into a container 27. The position of the magnets 20 and 20$^a$ may be adjusted toward and from the covering of the drum by moving the magnets bodily with respect to their supporting blocks 20$^b$ and 21$^b$, said blocks being the members that are mounted upon the shaft 17. The position of the magnets may also be adjusted circumferentially of the drum by moving the said blocks 20$^b$ and 21$^b$ to varying positions around the shaft 17, and then tightening their binding bolts 20$^c$. It is clear that the magnetic force or flux of the various magnets may be varied by manipulation of the rheostats 18 and 19.

While the passage of the ore through the polarizer unit 6 increases the magnetic properties of the paramagnetic contents of ores it has no effect upon the diamagnetic content, such as silica, lime, etc. After premagnetic treatment in this polarizer unit, the paramagnetic contents of the ores will still vary in magnetic properties in about the same proportions as they did originally, but all paramagnetic ores will have their magnetic properties increased many times.

We are aware of the fact that it is common practice to magnetically separate ores, but we are not aware that it has ever been proposed to pretreat the ore to first increase the magnetic qualities of the paramagnetic content thereof, and thereafter subject this ore to the action of magnets, for the purpose of separating the same, as herein described. Therefore, it will be apparent that the present invention represents a marked advance in the art, as previously practiced, and renders it possible to separate ores not heretofore readily separable, and to bring within the range of practicable commercial use many ores now so difficultly separable as to render them of no commercial value.

It is to be observed that the triangular shape of the slats 16 permits the diamagnetic content of the ore to roll or flow off readily, while they hold all paramagnetic ores as they travel upward on the drum.

It is further to be noted that the heads of the drums project outwardly circumferentially beyond the covering 15 of the drum to provide retaining sides that extend beyond the cover and prevent the ore from falling off the ends of the drum. We prefer to provide manhole openings 29 in a head of the drum, so that access may be had to the magnets for the purpose of adjusting the same.

While the method and apparatus of the present invention was designed, and is particularly valuable for the removal of silica and lime from manganese ores, containing more or less iron, nickel, cobalt, etc., along with silica and lime, we wish to make it clear that its use is, by no means, restricted to that particular purpose, because it is apparent that it may be used in the separation of any ores having a paramagnetic content differing from the magnetic content of any other constituent element of the ore.

Furthermore, it is clear that there is a broad thought involved in the present invention, which goes materially beyond the provision of this specific type of apparatus that we have chosen for carrying out the invention. That is to say, the thought of premagnetizing the ore to render it more sensitive to the action of magnetic separating apparatus constitutes an invention of great importance, wholly aside from the particular apparatus that may be used in carrying it out.

While the continuous feed, continuous action, rotary mechanism illustrated in our drawings is particularly adapted to carry out the process in a highly efficient way, it is to be understood that any other means of conducting a premagnetized ore past separating magnets is within the scope of the invention.

Consequently, it is to be understood that the invention includes within its purview anything falling within either the terms or the spirit of the appended claims.

Having described our invention, what we claim is:

1. Apparatus of the character described, comprising a supporting frame and fixed shaft, a cylinder mounted to turn upon said shaft, fixed magnets carried by said shaft and adjustable radially and circumferentially with respect thereto, and extending substantially the full length of the cylinder, said magnets being arranged in two sets, one set upon each side of the vertical line of the center of the cylinder, and means for energizing said magnets.

2. A device of the character described, comprising a hopper, a cylindrical polarizer arranged there beneath, a chute leading from the bottom of the polarizer, a controlling valve for said chute, a cylinder disposed horizontally with respect to the polarizer, said chute delivering material to said cylinder substantially across the length thereof, said cylinder comprising a pair of heads, and an intermediate cylindrical body extending between said heads, said heads projecting outwardly beyond the body, a plurality of slats carried by the body between the projecting portions of said heads, a fixed shaft upon which the cylinder turns, a pair of sets of fixed magnets carried by said shaft, conducting wires leading through the hollow shaft to supply current for energizing said magnets, said sets of magnets being disposed upon opposite sides of the vertical center line of the cylinder, a receptacle for diamagnetic material beneath the discharge end of the hopper, and means for varying the strength of the current supplied to the two sets of magnets.

3. A mechanism for separating ores, comprising a travelling conveyer, magnets associated with said conveyer in such manner as to attract the paramagnetic content of ore upon said conveyer, a polarizing unit disposed wholly in advance of the conveyer and through which the ore passes before its delivery to the conveyer and by which the ore is subjected to a magnetizing action prior to the time that it is subjected to any separating action by the magnets, and means for delivering the ore from said polarizing unit to the conveyer.

4. A structure as recited in claim 3, wherein some of the magnets associated with the conveyer are arranged in a group, the individual magnets of which are of varying magnetic strength, as and for the purposes set forth.

5. A mechanism of the character described, comprising a magnetizing chamber through which the ore is passed, and means for creating a magnetic field therein, a rotative drum, means for delivering the ore from the magnetizing chamber to the periphery of the drum, and a pair of groups of magnets disposed upon the interior of said drum upon opposite sides of the vertical center thereof, that group of magnets upon the side of the drum, which first receives the material comprising a group of magnets of successively reversed polarities so that as the material passes thereby it is agitated to release the diamagnetic content from the paramagnetic content, and that group of magnets upon the other side of the cylinder consisting of a plurality of magnets of varying magnetic strengths, as and for the purposes set forth.

In testimony whereof they affix their signatures.

HARRY P. OSBORNE.
CLIFTON C. FARMER.
REUBEN B. TEETER.